United States Patent
Sun et al.

(10) Patent No.: US 9,520,072 B2
(45) Date of Patent: *Dec. 13, 2016

(54) SYSTEMS AND METHODS FOR PROJECTING IMAGES ONTO AN OBJECT

(71) Applicant: University of South Florida (A Florida Non-Profit Corporation), Tampa, FL (US)

(72) Inventors: Yu Sun, Tampa, FL (US); Adrian S. Johnson, Land O Lakes, FL (US)

(73) Assignee: University of South Florida, Tampa, FL (US)

( * ) Notice: Subject to any disclaimer, the term of this patent is extended or adjusted under 35 U.S.C. 154(b) by 553 days.

This patent is subject to a terminal disclaimer.

(21) Appl. No.: 13/624,371

(22) Filed: Sep. 21, 2012

(65) Prior Publication Data

US 2013/0069940 A1 Mar. 21, 2013

Related U.S. Application Data

(60) Provisional application No. 61/537,311, filed on Sep. 21, 2012.

(51) Int. Cl.
- G06T 17/00 (2006.01)
- G09B 19/00 (2006.01)
- G06T 19/00 (2011.01)

(52) U.S. Cl.
CPC .......... G09B 19/003 (2013.01); G06T 19/006 (2013.01)

(58) Field of Classification Search
None
See application file for complete search history.

(56) References Cited

U.S. PATENT DOCUMENTS

| 5,772,593 A * | 6/1998 | Hakamata .............. 600/407 |
| 8,504,136 B1 * | 8/2013 | Sun et al. .............. 600/407 |
| 2009/0226069 A1 * | 9/2009 | Razzaque et al. ....... 382/131 |
| 2010/0257214 A1 * | 10/2010 | Bessette .............. 707/812 |
| 2011/0205341 A1 * | 8/2011 | Wilson ........... H04N 13/0275 348/51 |
| 2012/0092328 A1 * | 4/2012 | Flaks et al. ............ 345/419 |

OTHER PUBLICATIONS

Huang, Hsiu-Mei, Ulrich Rauch, and Shu-Sheng Liaw. "Investigating learners' attitudes toward virtual reality learning environments: Based on a constructivist approach." Computers & Education 55.3 (2010): 1171-1182.*

Wilson, Andrew D., and Hrvoje Benko. "Combining multiple depth cameras and projectors for interactions on, above and between surfaces." Proceedings of the 23nd annual ACM symposium on User interface software and technology. ACM, Oct. 2010.*

(Continued)

*Primary Examiner* — Sultana M Zalalee
(74) *Attorney, Agent, or Firm* — Thomas | Horstemeyer, LLP (57) ABSTRACT

In one embodiment, a method for projecting images on a subject includes determining a pose and position of the subject, adjusting a three-dimensional model of an anatomical structure of the subject to match the determined pose and position, and projecting an image of the anatomical structure onto the subject in registration with the actual anatomical structure of the subject to illustrate the location of the structure on or within the subject.

18 Claims, 6 Drawing Sheets

(56) References Cited

OTHER PUBLICATIONS

Zhou, Feng, Henry Been-Lirn Duh, and Mark Billinghurst. "Trends in augmented reality tracking, interaction and display: A review of ten years of ISMAR." Proceedings of the 7th IEEE/ACM International Symposium on Mixed and Augmented Reality. IEEE Computer Society, 2008.*
Tobius Blum, Augmented Reality Magic Mirror using the Kinect, posted on Jan. 7, 2011, [online][Retrieved from http://web.archive.org/web/20110107072759/http://campar.in.tum.de/Chair/ProjectKinectMagicMirror] [Retrieved on Oct. 27, 2015 5:22:39 PM].*
Kar, Abhishek. "Skeletal tracking using microsoft kinect." Methodology 1 (2010): 1-11.*
J. Park, M. Chung, S. Hwang, Y. Lee, D. Har, and H. Park. Visible korean human: Improved serially sectioned images of the entire body. IEEE Transactions on Medical Imaging (TMI), 24(3):352-360, 2005.*
SimplySim, Control your 3D application with Kinect, Uploaded on Jan. 10, 2011, [online][Retrieved from: https://www.youtube.com/watch?v=v0G0Cb7Zqjk][ Retrieved on:Oct. 29, 2015 12:02:49 PM].*
Y. Baillot, J. Rolland, K. Lin, and D. Wright. Automatic modeling of knee-joint motion for the virtual reality dynamic anatomy (VRDA) tool. Presence, 9(3):223-235, 2000.*
U. Schiefele, "Interest, learning, and motivation," Educational Psychologist, vol. 26, No. 3, pp. 299-323, 1991.
C. Dede, "Immersive Interfaces for Engagement and Learning," Science, vo. 323, No. 5910, pp. 66-69, Jan. 2, 2009.
Botvinick, et al. "Rubber hands "feel" touch that eyes see", Nature, vol. 391, No. 6669, pp. 756-756, 1998.
M. Gonzalez-Franco, et al. "The contribution of real-time mirror reflections of motor actions on virtual body ownership in an immersive virtual environment", pp. 11-114.
S. J. Cunningham, et al., "Yours or mine? Ownership and memory," Consciousness and Cognition, vol. 17, No. 1, pp. 312-318, 2008.
A. Baddeley, "Working memory," Science, vol. 255, No. 5044, pp. 556, 1992.
Symons, et al., "The self-reference effect in memory: A meta-analysis," Psychological bulletin, vol. 121, No. 3, pp. 371, 1997.
Gillihan, et al., "Is self special," A critical review of evidence from experimental psychology and cognitive neuroscience. Psychological Bulletin, vol. 131, No. 1, pp. 76-97, 2005.
Macrae, et al., "Medial prefrontal activity predicts memory for self", Cerbral Cortex, vol. 14, No. 6, pp. 647, 2004.

Reed, et al., "The psychological reality of the body schema: A test with normal participants," Journal of Experimental Psychology: Human Perception and Performance, vol. 21, No. 2, pp. 334, 1995.
Harrison, et al. "OmniTouch: wearable multitouch interaction everywhere," pp. 441-450.
Harrison, et al., "Skinput: appropriating the body as in input surface," pp. 453-462.
Shotton, et al., "Real-time human pose recognition in single depth images," p. 3.
Aggarwal, et al., "Human motion analysis: A Review", pp. 90-102.
Zang, "A flexible new technique for camera calibration", Pattern Analysis and Machine Intelligence, IEEE Transactions on vol. 22, No. 11, pp. 1330-1334, 2000.
Celsi, et al. "The Role of Involvement in Attention and Comprehension Processes," Journal of Consumer Research, pp. 210-224, 1998.
Henderson, et al., "Opportunistic Tangible User Interfaces for Augmented Reality," Visualization and Computer Graphics, IEEE transactions on, vol. 16, No. 1, pp. 4-16, 2010.
Klein, et al., "The nature of self-referent encoding: The contributions of elaborative and organizational processes," Journal of Personality and Social Psychology, vol. 55, No. pp. 5, 1988.
Klein, et al., "Two self-reference effects: The importance of distinguishing between self-descriptiveness judgments and autobiographical retrieval in self-referent encoding," Journal of Personality and Social Psychology, vol. 56, No. 6, pp. 853, 1989.
Rogers, et al., "Self-reference and the encoding of personal information", Journal of Personality and Social Psychology, vol. 35, No. 9, pp. 677, 1977.
Kooi, et al. "Visual comfort of binocular and 3D displays", p. 586.
P. Lincoln, et al. "Continual surface-based multi-projector blending for moving objects", pp. 115-118.
W. Odom, et al., "Teenagers and their virtual possessions: Design opportunities and issues," pp. 1491-1500.
Reeder, et al., "Self-referent processing and recall of prose," Journal of Educational Psychology, vol. 79, No. 3, pp. 243, 1987.
Paul Ridden, "AnatOnMe projects patients' insides onto their outsides", http://www.gizmag.com/anatonme-projects-onto-patient-body/18673/, retrieved Sep. 20, 2011.
K.K. Lee, et al. A hand-held 3D display system that facilitates direct manipulation of 3D virtual objects, pp. 65-70.
Kuratate, et al. "Estimation and Animation of Faces Using Facial Motion Mapping and a 3D Face DataBase", Computer-Graphic Facial Reconstruction, Elsevier Services, Jul. 2005.
Kihlstrom, et al., "Information Processing and The Study of the Self", Advances in Experimental Social Psychology, vol. 21, 1988.

* cited by examiner

SYSTEMS AND METHODS FOR PROJECTING IMAGES ONTO AN OBJECT

CROSS-REFERENCE TO RELATED APPLICATION(S)

This application claims priority to co-pending U.S. Provisional Application Ser. No. 61/537,311, filed Sep. 21, 2011, which is hereby incorporated by reference herein in its entirety.

NOTICE OF GOVERNMENT-SPONSORED RESEARCH

This invention was made with Government support under grant contract number 1035594 awarded by the National Science Foundation (NSF). The Government has certain rights in the invention.

BACKGROUND

Human anatomy is regularly taught in most school curriculums. Nevertheless, it has been found that many educated children and adults cannot locate their major internal organs, even while referencing their own bodies. Knowing where organs lie within our bodies is not only important for those in science and medicine, but also for general health awareness and maintenance.

Multimedia and computer-based training have emerged as effective tools employed by most U.S. educational institutions. Despite their impressive successes, these tools are still limited in their ability to spark students' engagement, motivation, and interest in learning.

Educational computer games introducing or reinforcing material have been used in classrooms to help address these issues. However, standard gamification of material may not be enough to stimulate a personal interest and encourage students to engage in desired learning behaviors. Many games do not captivate ongoing interest in the underlying subject matter. Furthermore, there are effects on material learned in an unnatural context, such as a book or screen-based game when transferred to a natural application context.

In view of the above discussion, it can be appreciated that it would be desirable to have improved ways of teaching human anatomy.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have alternative ways of teaching human anatomy. Disclosed herein are systems and methods for projecting images on objects. In some embodiments, the images are images of anatomical structures and the objects are live human subjects. The images can be based upon three-dimensional (3D) models of the structures and the models can be adjusted to account for the pose and position of the human subjects. In some embodiments, the skeletal pose and position are tracked as the subject moves and the images of the structures are modified to match the new poses and positions in real time. In further embodiments, the systems and methods enable on-self anatomical instruction.

In the following disclosure, various specific embodiments are described. It is to be understood that those embodiments are example implementations of the disclosed inventions and that alternative embodiments are possible. All such embodiments are intended to fall within the scope of this disclosure.

Of particular relevance to this disclosure is the area of research dealing with avatar or virtual body ownership. This is the sense of self-incorporation a user adopts for virtual interactions when he or she personally identifies with an avatar. Ownership may be an impactful engagement and memory enhancing technique.

Focusing the standard non-virtual definition of a sense of ownership down from all property to only immersive interactions, ownership equates to control of components involved in an interaction. Thus, the more control we have over more vital components, the more we feel a sense of ownership. There are multiple ways to trigger our innate ownership belief system. The classic rubber hand illusion delivers a sense of ownership nearly equivalent to that felt for a living body part, coaxed solely through tactile stimulation. Seeing an artificial arm touched while accompanied with similar touch sensations on the subject's real arm held out of sight gives most subjects the impression that the artificial arm was their own.

An avatar closely mirroring the motion of a user with no tactile input has also been found to create a sense of ownership. In a previous experiment, subjects were more apt to try to save their avatar from peril the more closely it mimicked their motions. The avatar was not accompanied with tactile stimulation. This is an alternative, visual way of lending ownership.

It appears exact fidelity is not required for ownership effects although more fidelity may be more effective. The motionless artificial arm looks plastic and the avatar is clearly a digital rendering, yet still the subjects believe enough to behave in what might appear to be an irrational manner, consciously against their better judgment. Similarly in stereoscopics, we still see a fused 3D image even if the images seen in each eye vary significantly in various ways. In such rudimentary functions, our conative system operates under thresholds wherein it is allowed to take over processing to a large degree.

There is evidence that the medium on which owned digital objects are displayed can be important. In recent years, people have been found to increasingly collect virtual possessions. These possessions have a temporary visual state when made visible but no material state. However, they may exhibit value to their owner as measured by monetary exchange or level of attachment. In a recent study, teenagers were shown to utilize the virtual possessions they own to bridge the material and virtual worlds. The innate placelessness and temporary presence of owned virtual objects was shown to be a valued quality and it enabled the mentally owned objects to conceptually meld their perceived value with that of the material contexts in which they were made present.

In this disclosure, the primarily focus is on visuo-motor methods of creating ownership. Objects are projected with similar motion, positioning, pose, and proximity to the subject's body. Such visual suggestions of ownership have been shown to have a substantial effect on memory.

Research indicates memory retention is well correlated with personal interest. A psychological effect termed self-referential encoding (SRE) holds that information relating to the self is preferentially encoded and organized above other types of information. Placing anatomical models on-self seeks to leverage this effect on the instructional material.

SRE originated with the seminal depth of processing (DOP) experiment wherein several encoding techniques were categorized from shallow to deep for their memory retention efficacy. Shallow encoding such as maintenance rehearsal, i.e., repeating a phone number to ourselves, temporarily stores the information in short term memory using the phonological loop. Rhyming is an example of a moderate level of processing. Semantic or elaborative encoding such as grammatical reasoning was found to be in the deepest and most effective level of processing. SRE has been found superior to all other forms of encoding, even very important other referent (OR) encoding.

Over the past 40 years, the SRE effect has been verified in numerous experiments. It is believed that this effect involves contributions of both elaborative and organizational processes. Elaborative encoding involves establishing association between newly encountered information and previously stored information. Associating concepts to the self construct has been argued to effectively organize the new information in connection with unparalleled familiarity of this most regularly used and highly detailed construct. Functional magnetic resonance imaging (fMRI) activity in the medial prefrontal cortex predicted both subsequent memory performance and judgments of self-relevance.

Motion and 3D effects may also effect engagement. There has been much work on spatial augmented reality and projecting 3D objects or 3D video onto tracked planar surfaces in the proper pose. Moving a surface while an image is projected onto it corresponding to the surface's orientation creates a 3D motion parallax. This is a 3D effect visible by the naked eye. For example, a planar handheld display allows interaction and can create 3D motion parallax.

Projecting onto more complex moving objects in real-time generally requires using a marker-or virtual marker-based tracking device. This requires cumbersome placement and monitoring of markers in the real world.

Research suggests that specialized associative processes may enhance on-body interaction engagement. Neuropsychological dissociations suggest the existence of a representation of the spatial relations among body parts not used for other spatial stimuli. This effect, termed a body schema, has been shown to be specific to the perception of bodies. This is perhaps unique from other complex 3D forms.

Further evidence of such specialized processes are Autotopagnosia and asomatognosia, disorders dealing with spatial orientation of parts of the body. These disorders specify portions of the brain that are dedicated to spatial representation of the human body.

Figure 1:
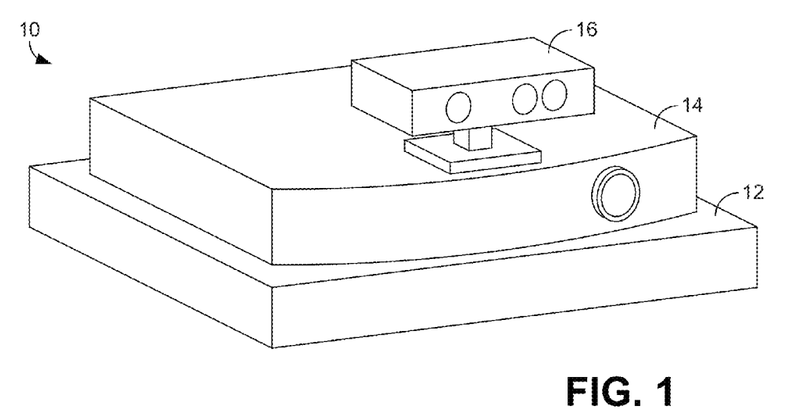
FIG. 1 is a perspective view of an embodiment of a system for projecting images on an object.

In view of the foregoing, it was determined to develop systems and methods in which anatomical structures can be projected onto human subject, to assist the subjects, or those observing the subjects, in leaning human anatomy. One goal was to develop classroom systems that are real-time, robust, yet inexpensive, easily constructed from readily available off the shelf parts, portable, and simple to set up. FIG. 1 illustrates an embodiment of such a system 10. As is shown in that figure, the system 10 generally comprises a computing device 12, as well as a projector 14 and a motion tracking device 16, which are communicatively coupled with the computing device. In some embodiments, the computing device 12 comprises a portable computing device, such as a notebook or laptop computer. An example architecture for the computing device 12 is described in reference to the FIG. 3 below.

In some embodiments, the projector 14 comprises a digital projector having a high lumens output, such as approximately 3,000 to 4,000 lumens. The motion tracking device 16 is configured to track the motion of objects within its field of view. In some embodiments, the motion tracking device 16 is configured to track human subjects and, using software resident on the device or the computing device 12, determine the skeletal pose and position of the subject(s).

In some embodiments, each of the components of the system 10 can be off-the-shelf items. By way of example, the motion tracking device 16 can be a Kinect™ motion sensing input device produced by Microsoft™ for the Xbox 360™ video game console and Windows™ personal computers. The Kinect™ can simultaneously provide real-time human pose estimation of up to two local collaborative users. It analyzes the interference in an infrared (IR) scatter pattern for localized depth calculations and a probabilistic and kinematic human pose model for joint calculations. The Kinect™ has an image resolution of 640×480 pixels with 11-bit depth, which provides 2,048 levels of sensitivity. The sensor has an angular field of view of 43° vertically and 57° horizontally. The horizontal field of the Kinect™ sensor at the minimum viewing distance of 2.6 feet (ft.) is therefore 34 inches (in.), and the vertical field is 25 in., resulting in a maximum resolution of just over 0.05 in. per pixel.

The Kinect™ sensor has a depth range of approximately 2.3 to 20 ft. and practical depth range of approximately 3.9 to 11 ft. The tangent of the center angle can be used to determine a horizontal field at the maximum depth. At approximately 11 ft., the horizontal field is roughly 12.5 ft. and the (minimum practical) resolution decreases to roughly 0.23 in. It is noted that this is the input resolution used for body location and pose estimation. The output resolution of the projected anatomical structures may easily be twice as precise given current projector technology.

Figure 2:
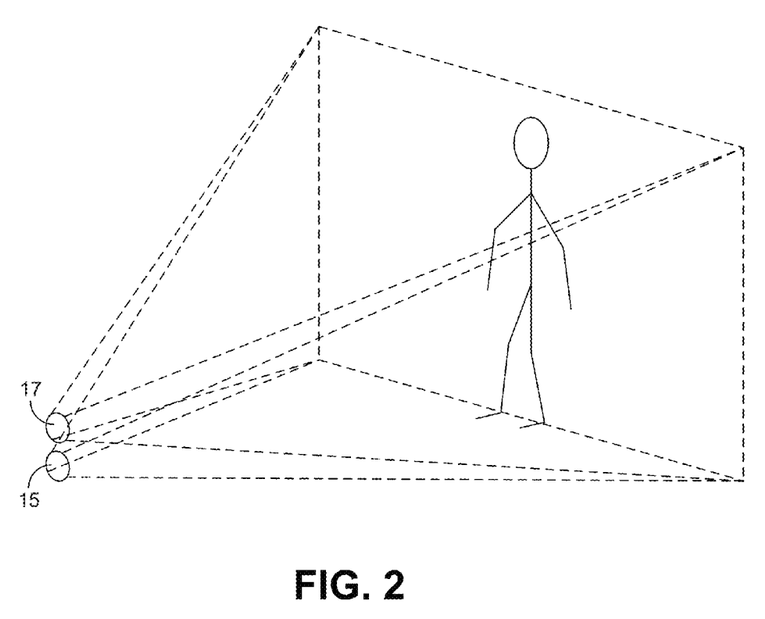
FIG. 2 is a schematic view illustrating tracking of a human subject and projection onto the subject.

There is some translational and rotational discrepancy between the motion tracking device 16 and the projector 14 that results from the spatial separation of those two components, as is apparent in FIG. 2, which schematically illustrates the projection field of a lens 15 of the projector versus the field of view of an image sensor 17 of the motion tracking device. In order to render the projected image on the sensed subject, the relative translation and orientation from the motion tracking device 16 to the projector 14 must be known. CV stereo calibration techniques can be used to determine these parameters. In some embodiments, this is accomplished by locating corners on an image of a chessboard with known measurements. The detected corners are then compared with their real world locations calculated from the chessboard dimensions in order to solve for the unknown parameters using triangulation.

Calibration can also be performed on the projector 14, which is simply the inverse of camera calibration using this same model. The projector 14 can be considered similar to a camera in that there is an image plane inside each device representing a real world plane on the chessboard, the primary difference being that the light rays travel in opposite directions.

The stereo calibration step requires a printed chessboard and a projected chessboard to be located on the same plane. To ensure a simple setup, the chessboard corners can be detected with feedback in real time. This enables the user to adjust the plane of the chessboard live without a rig or need for pressing capture keys.

The Kinect™ projection calibration results provide the extrinsic parameters to rotate and translate from the view of the Kinect™ into the view of the projector 14. Because the system 10 is used in the 3D world, one can simply rotate and translate the world by these values in order to project the scene as if it were being viewed by the projector 14.

Figure 3:
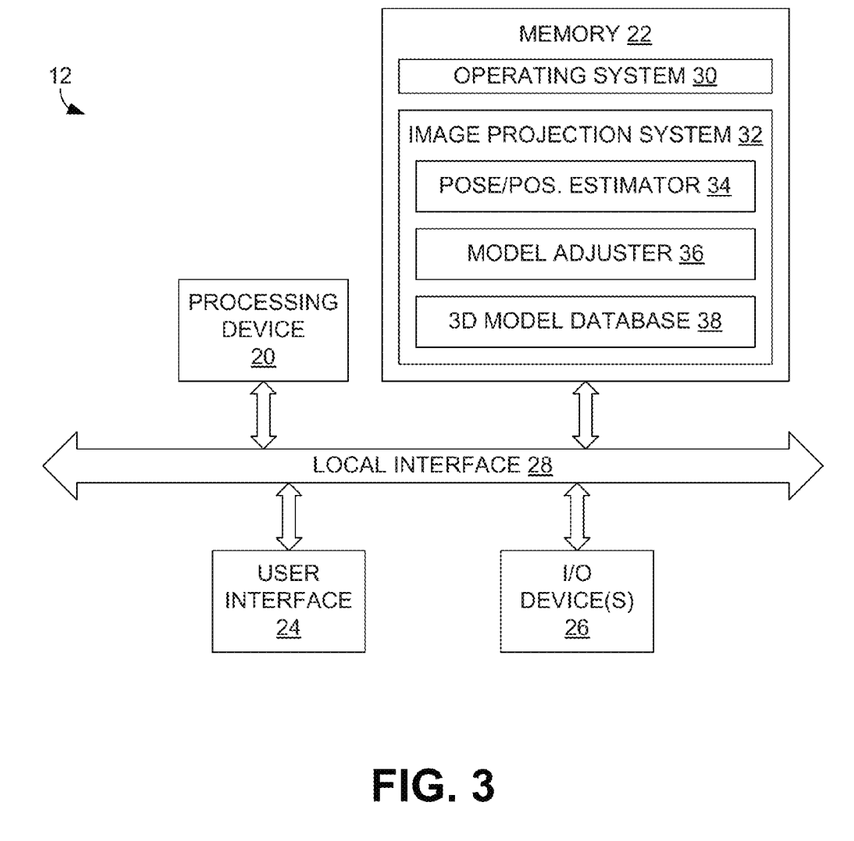
FIG. 3 is a block diagram of an embodiment of a computing device of the system of FIG. 1.

Once the projector 14 and the motion tracking device 16 have been calibrated, the system 10 can be used to project anatomical structures onto human subjects. This functionality is facilitated by processing performed by the computing device 12. FIG. 3 shows an embodiment of the architecture of the computing device 12. As is shown in that figure, the computing device 12 generally comprises one or more processing devices 20, memory 22, a user interface 24, and at least one I/O device 26, each of which is connected to a local interface 28.

The processing devices 20 can comprise a central computing processor (CPU) as well as a 3D graphics processing unit (GPU), each of which being capable of executing instructions stored within the memory 22. The memory 22 can include any one or a combination of volatile memory elements (e.g., random access memory (RAM)) and non-volatile memory elements (e.g., hard disk, compact disc (CD), flash memory, etc.). The user interface 24 comprises the components with which a user interacts with the computing device 12, and the I/O devices 26 are adapted to facilitate communications with other devices, such as the projector 14 and the motion tracking device 16.

Stored within memory 22 are various programs and/or algorithms (logic), including an operating system 30 and an image projection system 32. The image projection system 32 is configured to receive image data from the motion tracking device 16 and use that data to determine what images to project on one or more subjects within the field of view of the motion tracking device. In the embodiment of FIG. 3, the image projection system 32 includes a pose and position estimator 34 that is configured to determine the real-time skeletal pose and position of one or more subjects, and a model adjuster 36 that is configured to, based on the determined skeletal poses and positions, adjust one or more 3D models to determine what images to project onto the subjects. In some embodiments, the 3D models are stored in a model database 38, which also forms part of the image projection system 32.

Figure 4:
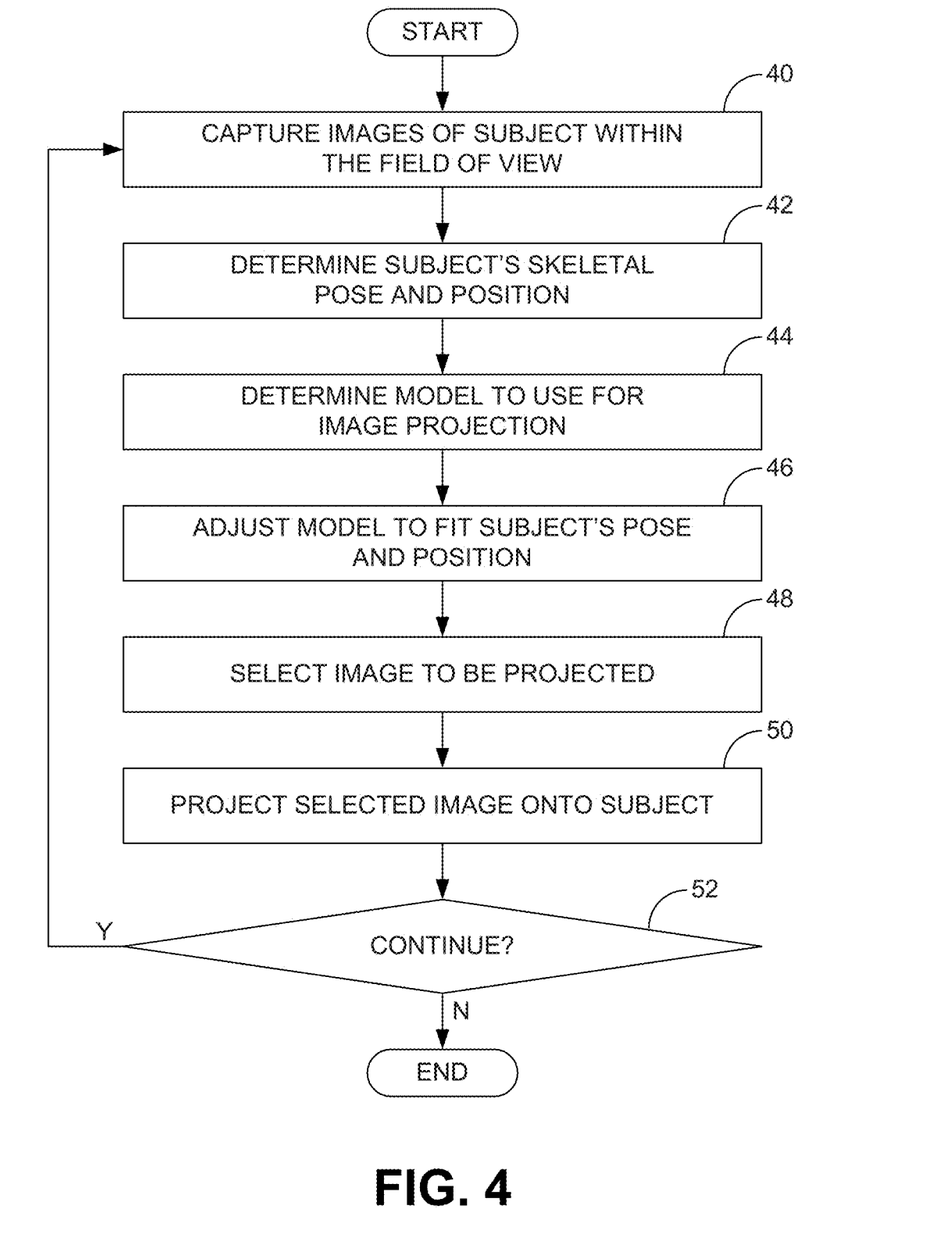
FIG. 4 is a flow diagram of a method for projecting anatomical structures onto a human subject.

FIG. 4 describes a method for projecting images onto an object. More particularly, FIG. 4 describes a method for projecting images of anatomical structures onto a human subject that can be performed by the system 10 described above. While the projection of internal anatomical structures on a human being is specifically described, it is noted that other images can be projected on a human being, or another subject, in similar manner. For example, external structures or features, such as those associated with certain medical conditions (e.g., skin cancer), could be projected onto the subject to assist students in identifying and diagnosing such conditions.

Beginning with block 40 of FIG. 4, the system captures images of a subject within the field of view of the motion tracking device's camera. The collected images can then be processed by the computing device. In particular, the computing device can determine the subject's skeletal pose and position, as indicated in block 42. In this context, the skeletal pose is the orientation of the subject's skeleton, which can be inferred from the images. The system is capable of determining whatever orientation in which the skeleton is situated. In some embodiments, the system estimates 3D points corresponding to key points on the body. For example, the system can estimate the locations of the shoulders and the hips, and from those features, estimate the position and orientation of the spine. The Euler axis and angle of rotation of the spine can be determined via the cross product and dot product, respectively, of a vector from the bottom of the spine to the center of the shoulders and the normal vector of the organ model. In addition, the locations and orientations of the head and the extremities can be estimated.

Regarding the skeletal position, the system further determines the location of the skeleton in the field of view of the motion tracking device as well as the distance of the skeleton to the motion tracking device. As mentioned above, the system can analyze the interference in an IR scatter pattern to perform localized depth calculations.

Once the skeletal pose and position have been determined, it can be determined which 3D model to use as a source for images to project, as indicated in block 44. In some embodiments, multiple models can be stored in the system. By way of example, one such model can be a model of the organs, while another model can be a model of the skeletal system. As a further example, another model can be a model of the nervous system. Yet another model can be the muscle system. Generally speaking, a model can be provided for any anatomical structure that is to be displayed, including external structures or features that are associated with one or more medical conditions. In some embodiments, the model that is to be used can be selected by a user with the computing device. In other embodiments, the model can be selected by the subject by performing particular gestures that can be detected and interpreted by the system, as described below.

Referring next to block 46, the selected model is adjusted to fit the subject's skeletal pose and position. In particular, the model is rotated, translated, and sized in a manner in which the anatomical structures that will be projected onto the subject will match the orientation and position of the subject's own anatomical structures. At this point, an image to be projected can be selected (block 48) and the image can be projected onto the subject (block 50).

With reference to the decision block 52, flow from this point depends upon whether or not image projection is to be continued. If not, flow for the session is terminated. If so, however, flow returns to block 40 at which the above-described process is repeated. It can therefore be appreciated that the method is a continuous process in which the images that are projected onto the subject can continually change as the pose and/or position of the subject changes. Accordingly, the system can be used to update the projected images in real time so that the correct images can be projected onto the subject irrespective of his or her pose and position.

Figure 5A:
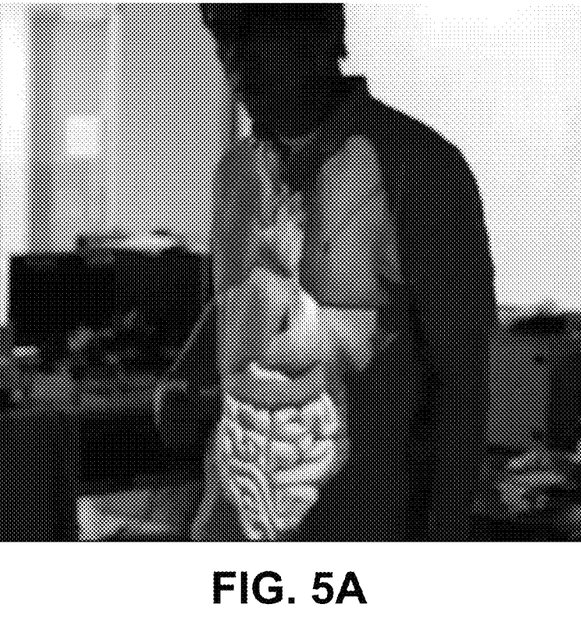
FIGS. 5A-5C are images of anatomical structures projected onto a first human subject while in various poses.
Figure 5B:
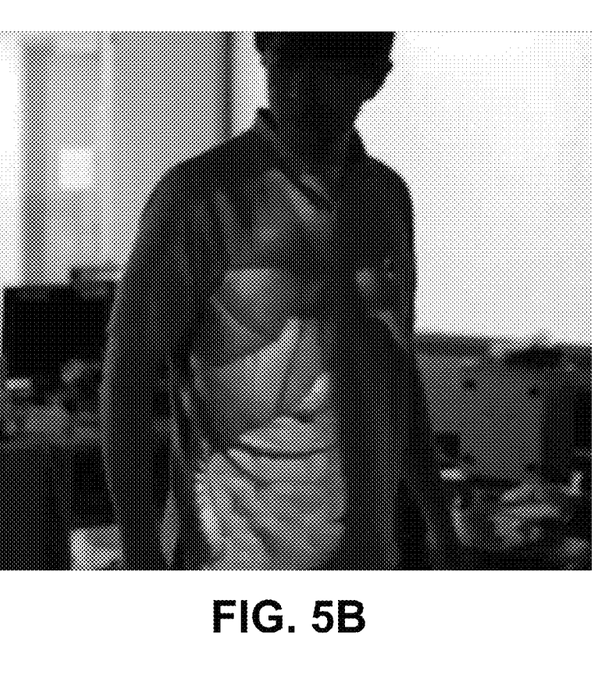
Figure 5C:
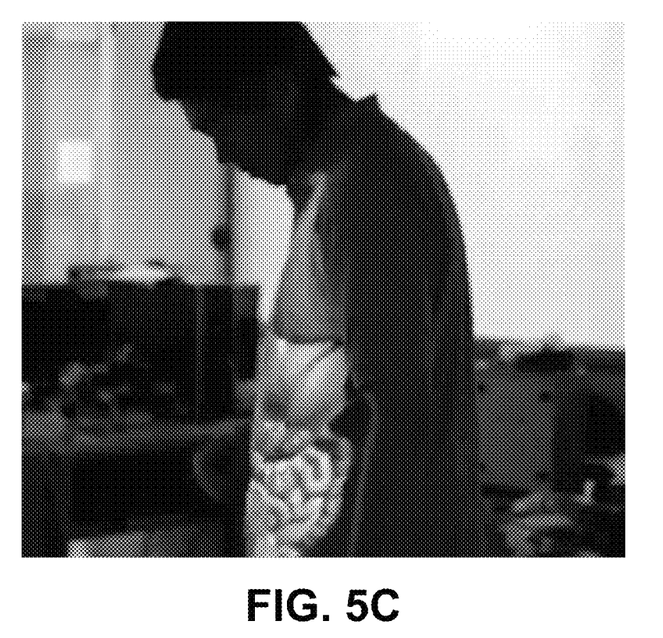

FIGS. 5A-5C show actual examples of images projected onto a first human subject using the method described above. Beginning with FIG. 5A, an image of the internal organs is projected onto the torso of the subject in registration with the positions of the subject's actual internal organs, which of course are not otherwise visible. As is apparent from FIG. 5A, the subject is facing the projector such that his shoulders lie in a plane that is substantially perpendicular to the direction of projection. As a result, the internal organs are shown in a front view.

FIG. 5B shows the subject after turning to his left. By so turning, the subject has altered the position of his internal organs relative to the projector. As can be appreciated from FIG. 5B, the image projected onto the subject has likewise changed to match the subject's new pose and position. In particular, the internal organs are shown in a right side view as the subject's actual internal organs would appear from the perspective of the projector if they were visible.

FIG. 5C shows the subject after turning to his right. As is shown in FIG. 5C, the internal organs are shown in a left side view. As can be appreciated from FIGS. 5A-5C, the internal organs can be shown from nearly infinite points of view so as to match substantially any pose and position.

Figure 6A:
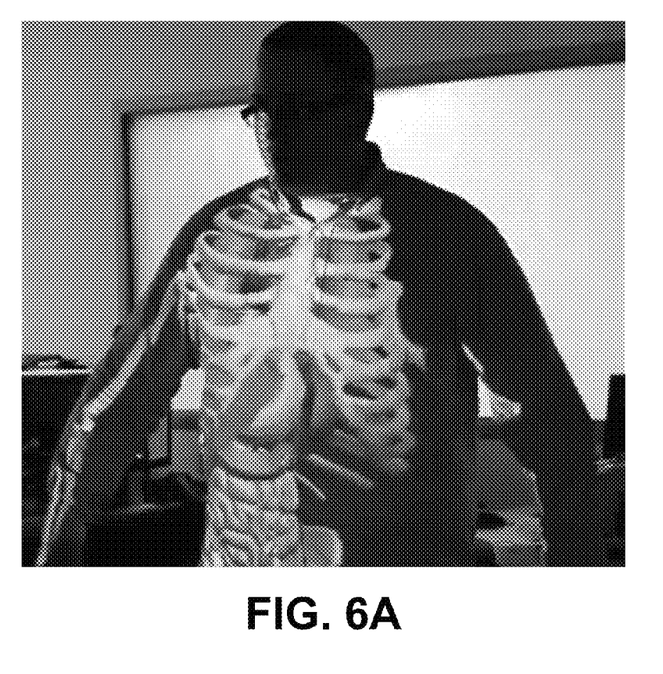
FIGS. 6A-6C are images of anatomical structures projected onto a second human subject while in various poses.
Figure 6B:
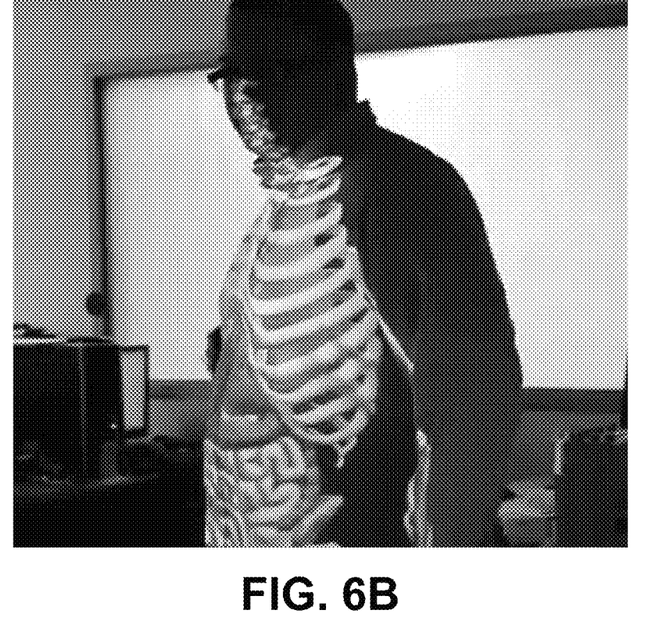
Figure 6C:
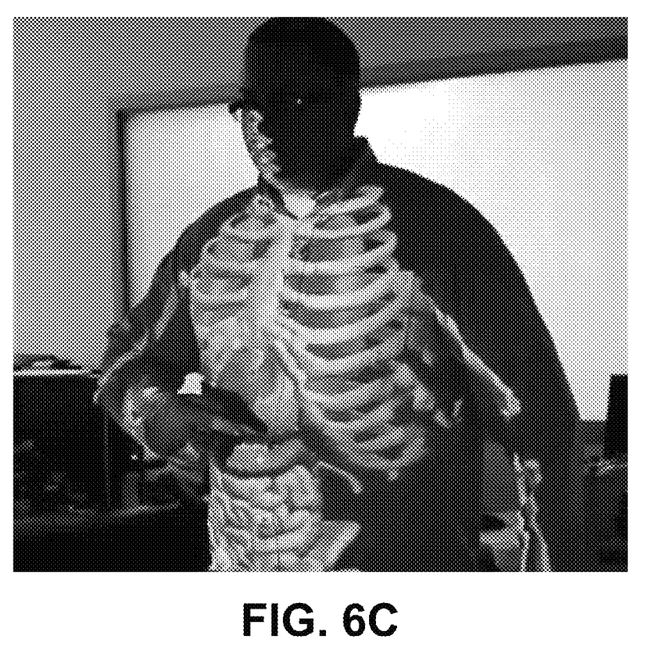

FIGS. 6A-6C show actual examples of images projected onto a second human subject using the method described above. Beginning with FIG. 6A, an image of the internal organs and a portion of the skeleton are projected onto the subject in registration with the positions of the subject's actual internal organs and skeleton. FIG. 6B shows an image of the organs and skeleton after they have been adjusted to fit a new pose and position of the subject.

As noted above, certain gestures of the subject can be detected and used as inputs to the system. FIG. 6C shows an example of this. In particular, FIG. 6C shows the subject pointing to a particular organ that is projected onto his torso. In some embodiments, the system can detect which organ is being pointed to and perform some addition action in response. Such additional actions can take many different forms. By way of example, the selected organ can be highlighted, removed, labeled, cross-sectioned, audibly described, and the like.

The functionality described above can be used in many different ways to provide anatomy instruction. For example, the system can incorporate quiz interaction in which the names of anatomical structures are spoken by the computer and the user (e.g., the subject) is given time to identify the correct structure. In some embodiments, gestures can be used to control the types of anatomical structures upon which the user will be quizzed. For instance, if the tracked subject flexes both arms, the system can interpret that gesture as a command to display the muscular system. In similar manner, crossing the arms into a "skull and crossbones" position under the head can cause the system to display the skeletal system. Similarly, shaking the hands quickly in a nervous fashion can trigger a nervous system quiz.

Certain gestures can also be used to trigger informational sequences that teach students more about how the body functions during certain activities. For example, if a subject makes a smoking gesture, the lungs projected on the subject can shrink and become cancerous. If the subject performs a gesture that emulates throwing the cigarette away, the lungs can slowly return to health.

Experiments were performed to test the effectiveness of the system. In particular, the system was demonstrated to seven k-12 teachers to assess the usefulness and the potential of the system in a classroom setting. Each teach anonymously answered survey questions. In general they all either agreed or strongly agreed the system would be effective in class and more engaging than a textbook. It is interesting to note that they felt even more strongly about effectiveness than engagement. The teachers were also asked for detail about engagement effects and classroom effectiveness. Their responses indicate that they believe engagement and effectiveness are correlated and further that engagement has a causal relationship with effectiveness.

A student engagement exit survey (n=81) was also performed. The survey revealed support for an increased interest in anatomy (ES=+1.01, p<0.0048) and computer science (ES=+1.16, p<0.0027) with no significant change for law. The user evaluation results (n=16) showed high support for the students' belief that the system was more engaging (M=6.0+/−1.21) effective (M=5.60+/−1.50) and fun (M=6.36+/−0.69) than learning from a textbook.

The system was also displayed at several public locations and tested on random passersby. A Liked scale usability survey and quiz score card were administered to each participant upon exiting the quiz game. The effectiveness was tested on (n=50) students. The subject's education levels varied from 10th grade to Ph.D. Incorrect identifications were reduced during successive iterations. 100% identification occurred on average within 2.1 iterations.

Further testing was performed in two elementary schools in China. An engagement exit survey (n=55) similarly found support for an increased interest in anatomy (ES=+1.94, p<0.017) and computer science (ES=+0.36, p<0.0004). The user evaluation results (n=16) showed more support than the U.S. results for the students' belief that the system was more engaging (M=6.25+/−0.87) effective (M=6.19+/−0.83) and fun (M=6.625+/−0.5) than learning from a textbook. There appears to be less of a relative concern for effectiveness among the students.

These preliminary test results suggest that learning organs on an on-body display is more effective than learning on a standard display

The invention claimed is:

1. A method for providing education to a student as to an internal anatomical structure, the method comprising:
continually tracking over time a living subject with a motion tracking device external to the subject;
continually estimating the subject's real-time skeletal pose and position over the time based on data obtained from the motion tracking device and continually determining the real-time pose and position of the subject's internal anatomical structure over the time based on the estimated skeletal pose and position;
continually adjusting a three-dimensional model of the internal anatomical structure to match the determined pose and position; and
continually projecting images of the internal anatomical structure onto the subject in registration with the actual internal anatomical structure of the subject to illustrate the location of the structure within the subject to a student, wherein the images of the internal anatomical structure remain in registration with the subject's actual internal anatomical structure as the subject moves because of the continual tracking, adjusting, and projecting.

2. The method of claim 1, wherein the subject is a human subject and the anatomical structure is an internal anatomical structure.

3. The method of claim 2, wherein the internal anatomical structure is an internal organ.

4. The method of claim 2, wherein the internal anatomical structure is a bone.

5. The method of claim 1, wherein continually projecting images comprises continually updating the images projected onto the subject so that the anatomical structure maintains its registration with the actual anatomical structure as the subject moves.

6. The method of claim 1, further comprising detecting a gesture made by the subject and performing in response an action associated with the gesture.

7. The method of claim 6, wherein the gesture comprises the subject pointing to a particular anatomical structure in the projected image.

8. The method of claim 6, wherein the action comprises projecting onto the subject a particular type of anatomical structure associated with the gesture.

9. The method of claim 6, further comprising quizzing the subject as to the anatomical structure.

10. A non-transitory computer-readable medium that stores an image projection system configured to provide education to a student as to an internal anatomical structure, comprising:
   logic configured to continually estimate a skeletal pose and position of a living subject over time from data collected by continually tracking the subject with a motion tracking device external to the subject and to continually determine the real-time pose and position of the subject's internal anatomical structure over the time based on the estimated skeletal pose and position;
   logic configured to continually adjust a three-dimensional model of the internal anatomical structure of the subject to match the determined pose and position; and
   logic configured to continually generate images of the internal anatomical structure for projection onto the subject in registration with the actual internal anatomical structure of the subject to illustrate the location of the structure within the subject to a student, wherein the images of the internal anatomical structure remain in registration with the subject's actual internal anatomical structure as the subject moves because of the continual tracking, adjusting, and generating.

11. The non-transitory computer-readable medium of claim 10, wherein the logic configured to estimate a skeletal pose and position comprises logic configured to estimate the skeletal pose and position from images captured with a motion tracking device configured to track movement of the subject.

12. The non-transitory computer-readable medium of claim 10, wherein the logic configured to continually generate images is configured to continually update the images to be projected onto the subject so that the anatomical structure maintains its registration with the actual anatomical structure as the subject moves.

13. The non-transitory computer-readable medium of claim 10, further comprising logic configured to detect gestures made by the subject and to perform actions associated with the gestures.

14. The non-transitory computer-readable medium of claim 10, further comprising logic configured to quiz the subject about the anatomical structures.

15. A system for providing education to a student as to an internal anatomical structure, the system comprising:
   an external motion tracking device configured to continually track a living subject over time;
   a projector configured to continually project images onto the subject; and
   a computing device configured to (i) continually receive data from the motion tracking device, continually estimate a skeletal pose and position of the subject from the data, and continually determine the real-time pose and position of the subject's internal anatomical structure over the time based on the estimated skeletal pose and position, (ii) continually adjust a three-dimensional model of the internal anatomical structure to match the determined pose and position, and (iii) continually provide updated images of the internal anatomical structure to the projector for projection onto the subject in registration with the actual internal anatomical structure of the subject to illustrate the location of the structure within the subject to a student, wherein the images of the internal anatomical structure remain in registration with the subject's actual internal anatomical structure as the subject moves because of the continual determining, adjusting, and providing.

16. The system of claim 15, wherein the motion tracking device is configured to capture images of the subject and the computing device is configured to estimate the skeletal pose and position from the captured images.

17. The system of claim 15, wherein the computing device is further configured to detect gestures made by the subject and to perform in response actions associated with the gestures.

18. The system of claim 15, wherein the computing device is further configured to quiz the subject as to the anatomical structures.

* * * * *

UNITED STATES PATENT AND TRADEMARK OFFICE
CERTIFICATE OF CORRECTION

PATENT NO. : 9,520,072 B2  
APPLICATION NO. : 13/624371  
DATED : December 13, 2016  
INVENTOR(S) : Sun et al.

Page 1 of 1

It is certified that error appears in the above-identified patent and that said Letters Patent is hereby corrected as shown below:

On the Title Page

Item (60) should read:  
Provisional application No. 61/537,311, filed on Sep. 21, 2011.

Signed and Sealed this  
Sixteenth Day of May, 2017

Michelle K. Lee  
*Director of the United States Patent and Trademark Office*